United States Patent
Brautsch et al.

(10) Patent No.: US 8,793,972 B2
(45) Date of Patent: Aug. 5, 2014

(54) GAS TURBINE INSTALLATION WITH FLUE GAS RECIRCULATION DEPENDENT ON OXYGEN CONTENT OF A GAS FLOW

(75) Inventors: Andreas Brautsch, Wuerenlingen (CH); Dieter Winkler, Lauchringen (DE); Richard Carroni, Niederrohrdorf (CH)

(73) Assignee: Alstom Technology Ltd, Baden (CH)

( * ) Notice: Subject to any disclaimer, the term of this patent is extended or adjusted under 35 U.S.C. 154(b) by 1227 days.

(21) Appl. No.: 12/645,302

(22) Filed: Dec. 22, 2009

(65) Prior Publication Data

US 2010/0115960 A1    May 13, 2010

Related U.S. Application Data

(63) Continuation of application No. PCT/EP2008/057062, filed on Jun. 6, 2008.

(30) Foreign Application Priority Data

Jun. 19, 2007  (CH) .................................... 0982/07

(51) Int. Cl.
*F02C 7/08* (2006.01)
(52) U.S. Cl.
USPC ........... 60/39.52; 60/39.182; 60/728; 60/39.5
(58) Field of Classification Search
USPC .......... 60/39.52, 39.182, 39.5, 773, 672, 683, 60/691, 728
See application file for complete search history.

(56) References Cited

U.S. PATENT DOCUMENTS

| | | | |
|---|---|---|---|
| 3,785,145 A | * | 1/1974 | Amann ................. 60/39.24 |
| 4,271,664 A | * | 6/1981 | Earnest ................ 60/39.181 |
| 5,271,215 A | | 12/1993 | Guillet |
| 5,595,059 A | | 1/1997 | Huber et al. |

(Continued)

FOREIGN PATENT DOCUMENTS

| | | |
|---|---|---|
| DE | 198 10 820 A1 | 9/1998 |
| DE | 102 97 365 T5 | 2/2005 |

(Continued)

OTHER PUBLICATIONS

International Search Report for PCT/EP2008/057062, mailed Oct. 29, 2008, List of references only.

(Continued)

*Primary Examiner* — William H Rodriguez
(74) *Attorney, Agent, or Firm* — Buchanan Ingersoll & Rooney PC (57) ABSTRACT

A method and installation are disclosed which can, for example, provide for reliable, low-Nox-emission operation of a gas turbine installation with hydrogen-rich fuel gas. An exemplary gas turbine installation includes an arrangement for flue gas recirculation into a compressor inlet and for fuel gas dilution. Oxygen content in combustion air can be reduced by recirculation of recooled flue gas, and the fuel gas can be diluted with compressed flue gas. The oxygen reduction in the combustion air can lead to minimum residual oxygen in the flue gas which can be used for fuel gas dilution. As a result of the flue gas recirculation, water content in the combustion air can be increased by feedback of the water which results as a combustion product. The oxygen reduction, increased water content, and fuel dilution can reduce the flame velocity of hydrogen-rich fuel gases and enable a robust, reliable and low-emission combustion.

14 Claims, 3 Drawing Sheets

(56) References Cited

U.S. PATENT DOCUMENTS

| | | | |
|---|---|---|---|
| 6,202,400 B1* | 3/2001 | Utamura et al. | 60/773 |
| 6,389,796 B1 | 5/2002 | Mandai et al. | |
| 6,655,150 B1* | 12/2003 | Åsen et al. | 60/772 |
| 6,886,344 B2* | 5/2005 | Frutschi et al. | 60/772 |
| 7,472,540 B2* | 1/2009 | Berenbrink et al. | 60/39.281 |
| 7,503,178 B2* | 3/2009 | Bucker et al. | 60/774 |
| 7,966,829 B2* | 6/2011 | Finkenrath et al. | 60/772 |
| 8,117,825 B2* | 2/2012 | Griffin et al. | 60/39.52 |
| 8,245,493 B2* | 8/2012 | Minto | 60/39.52 |
| 8,408,006 B2* | 4/2013 | Li et al. | 60/772 |
| 2004/0237536 A1 | 12/2004 | Frutschi et al. | |
| 2006/0272331 A1 | 12/2006 | Bucker et al. | |
| 2007/0044472 A1* | 3/2007 | Zhang | 60/605.2 |
| 2007/0044481 A1 | 3/2007 | Rabovitser et al. | |
| 2007/0261408 A1 | 11/2007 | Carrea et al. | |
| 2008/0087863 A1 | 4/2008 | Fisciier et al. | |
| 2008/0092513 A1 | 4/2008 | Carroni et al. | |
| 2011/0289898 A1* | 12/2011 | Hellat et al. | 60/39.52 |
| 2012/0096829 A1* | 4/2012 | West et al. | 60/39.24 |
| 2013/0047576 A1* | 2/2013 | Sander et al. | 60/39.182 |

FOREIGN PATENT DOCUMENTS

| | | |
|---|---|---|
| DE | 10 2005 015 151 A1 | 10/2006 |
| EP | 1 854 761 A2 | 11/2007 |
| JP | 07-004211 A | 1/1995 |
| JP | 10-082306 A | 3/1998 |
| JP | 2000-282810 A | 10/2000 |
| JP | 2001-107743 A | 4/2001 |
| JP | 2004-052631 A | 2/2004 |
| WO | WO 03/029618 A1 | 4/2003 |
| WO | WO 2005/064232 A1 | 7/2005 |
| WO | WO 2006/100176 A1 | 9/2006 |

OTHER PUBLICATIONS

Paolo Chiesa et al., "Natural Gas Fired Combined Cycles with Low $CO_2$ Emissions," Journal of Engineering for Gas Turbines and Power, Jul. 2000, pp. 429-436, vol. 122, ASME.

Office Action dated Feb. 26, 2013, issued in corresponding Japanese Patent Application No. 2010-512632 (1 page).

Office Action dated May 8, 2012, issued in corresponding Japanese Patent Application No. 2010-512632. (9 pages).

* cited by examiner

GAS TURBINE INSTALLATION WITH FLUE GAS RECIRCULATION DEPENDENT ON OXYGEN CONTENT OF A GAS FLOW

RELATED APPLICATIONS

This application claims priority as a continuation application under 35 U.S.C. §120 to PCT/EP2008/057062, which was filed as an International Application on Jun. 6, 2008 designating the U.S., and which claims priority to Swiss Application 00982/07 filed in Switzerland on Jun. 19, 2007. The entire contents of these applications are hereby incorporated by reference in their entireties.

FIELD

The disclosure relates to a gas turbine installation and a method for operating a gas turbine installation, such as installation with hydrogen-rich fuel gas wherein oxygen content of the combustion air can be reduced via flue gas recirculation.

BACKGROUND INFORMATION

The research and development of the combustion of hydrogen or hydrogen-rich fuels in gas turbines involves at least two factors:

On the one hand, there is a global interest in reducing the emission of greenhouse gases, especially of $CO_2$. One possibility for this is the changeover from fossil fuels to a hydrogen-based energy supply. In this case, this can be based on fossil raw materials with hydrogen synthesis and $CO_2$ bonding.

On the other hand, limited natural gas reserves have led to considerations of using synthetically processed gaseous fuels alternatively to, or in combination with, the combustion of conventional types of fuel. These synthetically processed gaseous fuels, as are found for example in an IGCC (Integrated Gasification Combined Cycle), which can contain high hydrogen concentrations.

The combustion of hydrogen in known combustion systems of gas turbines can lead to, for example, flashback and increased NOx emissions, on account of the high flame velocity and short ignition delay time of the hydrogen.

As countermeasures, in addition to the simple reduction of the operating values, the possibility of diluting the hydrogen-rich fuel with $N_2$ or other inert gases, and different concepts for the dilution of the combustion air or of the fuel gas with steam, are known. For example, steam is injected, or water is injected for evaporation in the air passage or in the fuel system.

For reduction of the NOx emissions, widely different possibilities for "mild combustion" or "flameless combustion" are known from literature. In this case, by recirculation of some of the flue gases, the oxygen concentration of the combustion air can be reduced. For this purpose, in DE10297365 it is proposed to recirculate some of the combustion air around the combustion chamber before expansion in the turbine and to mix it with the compressor exit air.

DE19810820 addresses increased NOx emissions when combusting nitrogenous fuels, such as occur for example when combusting ammoniacal fuel gases. For the reduction of this so-called "fuel NOx", it is proposed to further cool the flue gases after discharging from the turbine and to admix them in the inlet of the compressor or to compress them in a separate flue-gas compressor and to admix them at the inlet of the combustion chamber in order to find a minimum of NOx emissions in the case of an oxygen content of, for example, 14% to 16%.

The disclosures of DE10297365 and DE19810820 are hereby incorporated by reference in their entireties.

Flue gas recirculation is further known to increase the concentration of $CO_2$ in the flue gas and at the same time to reduce the discharging amount of flue gas and consequently to reduce the cost for $CO_2$ extraction from the flue gases (P. Chiesa, S. Consonni: Natural Gas Fired Combined Cycles with Low
$CO_2$ Emissions, Journal of Engineering for Gas Turbines and Power, Vol. 122, ASME, July 2000, p. 429-436, the disclosure of which is hereby incorporated by reference in its entirety).

A particular form of the flue gas recirculation is a recirculation of some of the flue gas in, and mixing with, the fuel gas. This form of flue gas recirculation into the fuel gas is known from U.S. Pat. No. 5,595,059, the disclosure of which is hereby incorporated by reference in its entirety. There, the flue gas is compressed by an flue gas compressor after discharging from a device for utilizing the waste heat which is connected downstream to the gas turbine installation. The compressed flue gas is mixed with fuel gas and fed to a reformer before the reformed gas is introduced into the combustion chamber.

SUMMARY

A method is disclosed for operating a gas turbine installation with hydrogen-rich fuel gas, comprising: cooling at least a portion of the flue gas in a recooler; recirculating at least the portion of flue gas mass flow into an intake air of a compressor, wherein the portion of recirculated flue gas mass flow is controlled by at least one control element; and providing as a control reference value for the control element, at least one of a residual oxygen content of the flue gas and an oxygen content of combustion air.

A gas turbine installation is disclosed. The gas turbine installation comprises: at least one compressor; at least one combustion chamber; at least one turbine; at least one flow splitter in an flue gas passage; a first flue gas line from the flow splitter to an exhaust stack; a second flue gas line from the flow splitter to an inlet of the compressor for flue gas recirculation; at least one control element for controlling a portion of recirculated flue gas mass flow, wherein a control reference value of the control element is at least one of a residual oxygen content of the flue gas and an oxygen content of combustion air; and at least one device for recooling of the recirculated flue gas flow.

BRIEF DESCRIPTION OF THE DRAWINGS

Other features and advantages encompassed by the present disclosure will become more apparent upon a detailed reading of the detailed description of exemplary embodiments in conjunction with the attached drawings, wherein.

DETAILED DESCRIPTION

An exemplary gas turbine installation is disclosed herein which can provide a reliable combustion with low CO and NOx emissions—which can be especially robust with regard to flashback—of hydrogen-rich fuel gases in gas turbines. Exemplary embodiments can address hydrogen-rich fuel gases with short ignition delay and high flame velocities, which can make a good premixing of air and fuel gas (which can be indispensable for low emissions) more difficult. Fuel gases with approximately 30% to 100% (e.g., ±10% or lesser or greater) of hydrogen portion are considered as hydrogen-rich fuel gases. These can, for example, be syngases or pure hydrogen.

An exemplary method is disclosed for the reduction of the oxygen content in combustion air of gas turbine installations via recirculation of flue gas.

Figure 1:
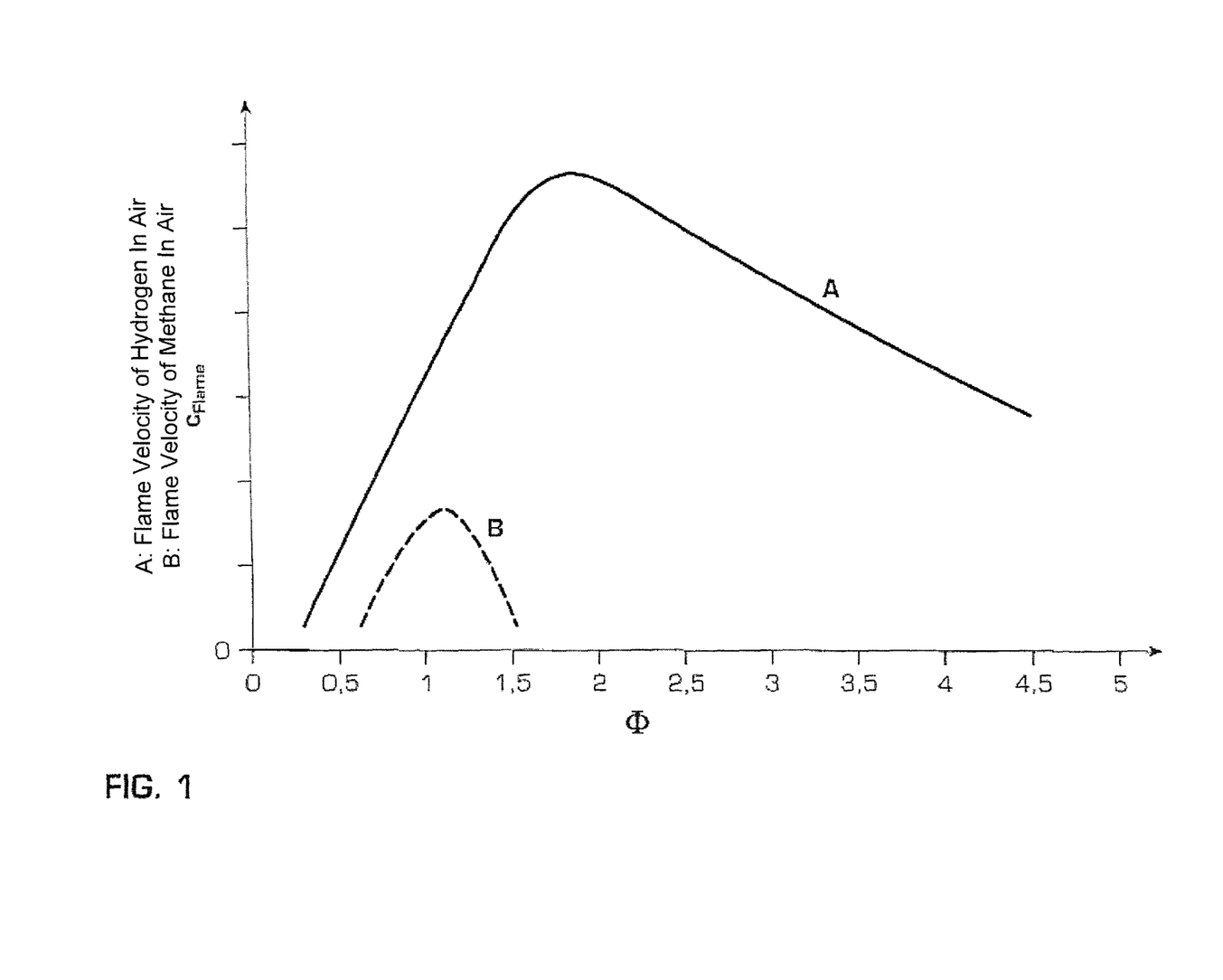
FIG. 1 shows a dependency of flame velocity of a hydrogen flame (A) and a methane flame (B) in air under exemplary atmospheric conditions upon the stoichiometric ratio Φ.

Hydrogen combustion can be understood with reference to FIG. 1 which shows the flame velocity of hydrogen in air (A) and methane in air (B) under atmospheric conditions in dependence upon a stoichiometric ratio $\Phi$. In contrast to natural gases (e.g., fuels with as a rule over 90% methane portion), which reach their highest flame velocity during practically stoichiometric combustion ($\Phi=1$, that is to say the entire air oxygen is consumed during the reaction with the fuel gas), and rich mixtures which quickly show a distinct reduction of the flame velocity, the hydrogen flame reaches its maximum in the case of rich mixtures with $\Phi$ of barely 2. The combustible range and a high flame velocity stretch to very rich mixtures. This high flame velocity in the case of rich mixture, without suitable countermeasures in a gas turbine can lead to ignition and flashback of the air-fuel mixtures directly after injection of the hydrogen-rich fuel. Ignition can take place before an appreciable reduction of the fuel content by mixing with compressor exit air. The flame in this case can flash back into the burners in an uncontrolled manner and, as a result of the locally high fuel concentrations, very large temperature spikes, with correspondingly heavy NOx emission, can occur. As a result of the flashback, the burner hardware can also be damaged within a short time.

For reduction of the oxygen content, a recirculation of some of the flue gases can be directed into the compressor intake flow. So as not to excessively increase the inlet temperature into the compressor as a result of flue gas recirculation, the recirculated flue gas can be cooled before mixing. For example the gas turbine installation can be connected to a boiler for utilizing the waste heat. The flue gases can be further cooled in a cooler after discharging from the boiler and before feedback to the intake air.

The proposed reduction of the oxygen content can lead to a reduction of the flame velocity and also to a longer ignition delay and consequently to a greater protection again flashback. Furthermore, it can enable a better mixing of fuel gases with combustion air. This can lead to reduced peak temperatures in the flame and consequently to a reduction of the NOx emissions. The smaller the oxygen content in the combustion air, the greater is the effect. The portion of recirculated flue gas can correspondingly be selected as large as possible. The recirculation portion, however, can be limited at the top since the oxygen content, after mixing in the fresh air mass flow upstream of the compressor inlet, should be sufficient to realize complete combustion in the combustion chamber, or combustion chambers, of the gas turbine installation.

Flue gas recirculation in gas turbine installations which are operated with hydrogen-rich fuel gases can also utilize the water content, which results when combusting hydrogen, for diluting the combustion air. A large part of the ensuing water vapor which is contained in the flue gas can consequently be fed again to the combustion gases and acts there both with diluting effect and also with kinetically retarding effect.

In an exemplary embodiment, flue gases are used for dilution of the fuel gas. This is possible in conjunction with the recirculation of flue gases which is described herein because, as a result of this, the residual oxygen content of the flue gas can be reduced to the extent that a flashback of the fuel gas-flue gas mixture can be excluded. Diluting the fuel gases can also lead to a reduction of the flame velocity and consequently to a greater protection against flashback. Furthermore, it can also enable a better mixing of fuel gases with combustion air. This can lead to reduced peak temperatures in the flame and consequently to a further reduction of NOx emissions. For feeding into the fuel gas, the recirculated flue gas can be compressed. For reduction of the compression work, the flue gas can be cooled before compression.

By intercooling during compression, the compression work can be further minimized. In the case of high pressure ratios, intercooling or cooling of the compressed flue gases may also be desired to prevent a chemical reaction of the residual oxygen with the fuel gas during fuel gas dilution. The intercooling can be carried out for example by injection of water. This can allow water, which acts with kinetically retarding effect, to be admixed directly with the fuel gas.

In the case of water injection for intercooling, and also in the case of further exemplary embodiments for water injection upstream of, or into, the compressor, and also into the fuel gases, a sufficiently fine atomization of the water can be used to ensure a fast evaporation of the water drops and to avoid drop erosion or drop accumulation.

Depending upon the environmental conditions, the operating conditions of the gas turbine installation, the recooling temperature and the portion of recirculated mass flow, condensation of the water vapor which is contained in the recirculated flue gas may occur during recooling. The condensate can be separated out by suitable processes in order to avoid erosion damage on the compressor. The condensate, after processing upstream of the compressor or in the compressor, can be injected in an atomized state into the intake air and/or into the recirculated flue gas which is provided for fuel dilution, for cooling and/or intercooling. The condensate processing can, for example, be dependent upon the purity of the condensate. This in turn can be dependent upon the fuel gas which is used, filtering of the intake air and environmental conditions. In an exemplary ideal case of clean compressor intake air and pure fuel gases, the condensate processing can be restricted to a safety filter.

The method of recirculation can be conducted so that the remaining oxygen content in the flue gases can be minimized. The portion of recirculated flue gas, however, is to be selected high enough for the oxygen content—after mixing into the fresh air mass flow upstream of the compressor inlet—to be as high as desired for a complete combustion in the combustion chamber, or combustion chambers, of the gas turbine installation.

For example, the residual oxygen in the flue gas can be reduced to about 3%. The residual oxygen can, for example, be dependent upon the operating parameters and also upon the type of construction and overall size of the gas turbine. Relevant operating parameters for example are the compressor inlet temperature, the hot gas temperature and the position of the compressor inlet guide vanes. The applied cooling technology and, associated with it, the portion of cooling air which is guided past the combustion chamber with regard to the total air, is an exemplary parameter which can have decisive influence upon the residual oxygen.

For an exemplary embodiment of a gas turbine installation with sequential combustion, the portion of recirculated mass flow lies, for example, at about 55% of the inducted mass flow. This is an exemplary value at full load. Depending upon operating parameters and design of the gas turbine, it can deviate considerably from this value. It is, for example, produced by calculation of desired mass flow after minimizing residual oxygen in the flue gas.

In an exemplary embodiment, a substantially constant portion of the flue gas mass flow is branched off and recirculated in an uncontrolled manner. The portion of recirculated flue gas mass flow can be designed for full load, or for a designated critical operating condition with regard to flashback, or for any other desired operating parameter. This is particularly possible in the case of syngases, the water portion of which is not appreciably above 50%, and which still have a sufficient margin against flashback in the case of oxygen content which is not optimally reduced. This manner of flue gas splitting is also possible if the recirculation is combined with other controlled measures for preventing flashback. The combination with further measures, for example, may become necessary when the installation is operated under conditions which deviate from the design point. For example, in the case of fixed flue gas splitting and recirculation, fuel gas dilution with externally supplied nitrogen or steam can be provided, in which the fuel gas dilution is controlled in dependence upon the residual oxygen content which is present in the compressor inlet air after feeding of the recirculated flue gas. At low partial load of the gas turbine installation, at which only a small amount of the oxygen is used for combustion and the residual oxygen content increases as a result, a high fuel gas dilution with externally supplied nitrogen or steam can be undertaken. This can be reduced as residual oxygen decreases. In an exemplary embodiment, the dilution of the fuel gases with recirculated flue gas in dependence upon the fuel gas composition, the operating parameters of the gas turbine, the burner design and the residual oxygen in the flue gases, can be restricted to defined operating conditions, or is not possible at all, on account of the risk of a flashback into the burners and into the FDS (fuel distribution system).

In further exemplary embodiments, the portion of recirculated flue gas mass flow can be controlled by means of at least one suitable control element. The control reference value in a first exemplary sub-embodiment can be the residual oxygen content of the flue gases. The reliable dilution of the fuel gases with recirculated flue gas can be a governing factor in this case. In a second exemplary sub-embodiment, the oxygen content of the combustion air can be the control reference value. The combustion—which is robust with regard to flashback—by means of recirculation can be a governing factor in this case. These embodiments can be realized both individually and in combination. The combination of controlling the two values can lead to a high redundancy and consequently to increased reliability. Furthermore, it can be ensured with the combination that under operating conditions which deviate from the design case the two parameters are kept within permissible limits.

Controlling to a reference value of the residual oxygen content carries out a comparison of the "actual value" of the residual oxygen content with the reference value. If the actual value is greater than the reference value, the recirculation portion can be increased. If the actual value is less than the reference value, the recirculation portion can be reduced.

In an exemplary embodiment, the reference value of the residual oxygen content in the flue gas or in the combustion air can be selected substantially constant. The reference value of the residual oxygen content can be designed for full load operation, or for a designated critical operating condition with regard to flashback, or for another operating parameter.

In a further exemplary embodiment, the reference value of the oxygen content can be controlled in dependence upon the fuel gas composition, the operating parameters of the gas turbine and the burner design. For example, at partial load the oxygen content can be increased compared with the full load value if the compressor exit temperature and the hot gas temperature are reduced and the risk of flashback is less than at full load as a result. This can facilitate a complete combustion and reduce the CO emissions which, depending upon operating parameters and fuel gas composition, can be problematical at partial load.

In a further exemplary embodiment, the reference value of the oxygen content can be controlled in dependence upon the fuel gas composition. The oxygen content can be reduced inversely proportional to the hydrogen content. In the case of pure hydrogen, the risk of flashback is at its greatest, but the forming of CO emissions can be excluded so that the oxygen content can be minimized. As hydrocarbon portion in the fuel gas increases, the risk of flashback as a rule recedes so that the oxygen content can be raised in order to ensure a CO-free and UHC (unburnt hydrocarbon)-free combustion which is as complete as possible. The combustion which is known as UHC-free combustion is a combustion which is free (or substantially free) of unburnt hydrocarbons.

An exemplary embodiment involves application of a method with pure hydrogen as fuel gas. In this embodiment, a CO-free and UHC-free combustion can be realized without $CO_2$ emission.

A dependency of desired oxygen content upon a designated critical operating parameters, such as compressor exit temperature, hot gas temperature, fuel gas composition, etc., can be approximated by equations and/or can be stored and interpolated in table form in the controller.

The combination of the explained effects with a known method for combusting hydrogen-rich fuel gases, such as fuel gas dilution with externally supplied nitrogen or steam, is also possible. Combinations can be desired for starting and can be advantageous during transient or nonsteady-state operation of the gas turbine installation.

When starting an exemplary gas turbine installation, the atmospheric air oxygen content will first be present in the installation, in the flue gas passages, in the recirculation lines and in an existing waste-heat boiler. Before a reduction of the oxygen content in the flue gas by combustion and recirculation, the recirculation does not lead to a desired reduction of the oxygen content in the combustion air. The flue gas is furthermore not yet suitable for the dilution of fuel gas. Until the flue gas oxygen content is lowered, a robust, flashback-free combustion should be ensured by other means. This can be, inter alia, the dilution of the fuel gas by, for example, nitrogen or steam, water injection into the compressor or burners, use of a diffusion flame for starting, and/or the use of a start-up fuel.

During transient operation, the oxygen consumption as a result of combustion, or the portion of the air which is guided past the combustion chamber, can quickly change. For example, during load shedding from full load the consumption of oxygen can be reduced by a factor of two or three within a short time (several seconds). The residual oxygen content in the flue gas can be correspondingly increased. This increase can be avoided by correspondingly quick adjustment of the recirculation portion. Controlling of the oxygen content can be advisably supplemented by means of feed forward control of the recirculation portion which, depending upon the transient event and depending upon operating parameters before the transient event, adjusts the recirculation ratio before controlling is resumed again. It can be practically simpler, within the meaning of a robust combustion, to combine the flue gas recirculation with other means. This can be inter alia the dilution of the fuel gas by, for example, nitrogen or steam and water injection into the compressor or burners.

During an exemplary normal load operation, via exemplary combination with other known means, the robustness of the combustion can be further increased. This can be, inter alia, dilution of the fuel gas by nitrogen or steam and water injection into the compressor or burners.

A combination is also sensible when for example steam and/or nitrogen are available for diluting the hydrogen-rich fuel gases but not sufficient alone for ensuring a reliable operation. In this case, a reduction of the oxygen content according to the proposed method can then reduce consumption of known media for reliable combustion of hydrogen-rich fuel gases.

In addition to the method, an exemplary gas turbine installation for hydrogen-rich fuel gases, which is characterized by at least one device for feedback of flue gases into the compressor inlet air, is disclosed herein.

An exemplary embodiment is a gas turbine installation with a flow splitter in the flue gas passage, an flue gas line from the flow splitter to the exhaust stack, and a second flue gas line from the flow splitter to the compressor inlet. This exemplary embodiment can provide an arrangement for cooling the recirculated flue gas flow.

In a further exemplary embodiment, the flow splitter can include adjustable flap for variable flow splitting.

In an alternative exemplary embodiment, the flow splitter can be a mechanically fixed splitter followed by an adjustable flap or a valve in the supply line to the exhaust stack and/or in the recirculation line. In an exemplary embodiment, only a partial mass flow is controlled by means of the flap or the valve so that an adjusting component with correspondingly smaller overall size can be selected. In addition, in an embodiment with an actuating component in the recirculation line, the flap or the valve can be constructed downstream of the recooler so that the thermal load remains low.

In an exemplary embodiment, the installation can also have at least one flue gas compressor which compresses some of the recirculated flue gas to a pressure which is high enough to introduce it into the fuel gas, flue gas lines connected to the at least one fuel gas system, at least one device for introducing the flue gas into the fuel gas for fuel gas dilution, at least one control valve for controlling the dilution mass flow, and also a fuel gas distribution system which directs the diluted fuel gas to the at least one burner.

In an exemplary embodiment, the installation can include a condensate separator in the recooler or downstream of the recooler.

A further exemplary embodiment includes a condensate processing plant, lines from the condenser to the processing plant and further to the compressor inlet, and pumps for water injection into the intake mass flow.

A further exemplary embodiment has condensate processing, lines from the condenser to the processing plant and further to the flue gas compressor, and pumps for injection of water into the flue gas compressor for intercooling.

Depending upon the selected control method disclosed herein, an exemplary embodiment has at least one means to determine the residual oxygen in the flue gas, in the compressor inlet air or in the combustion chamber inlet. This can be a measuring instrument for direct oxygen measuring, an online gas analysis, or a device for indirect determination. A means for indirect determination is for example a processor or controller which, from compressor intake mass flow, flue gas recirculation portion, fuel gas composition and fuel quantity measurement, calculates the residual oxygen. The intake mass flow in this case can be determined by means of the compressor characteristics and the environmental conditions (intake temperature, pressure and humidity), or via indirect measurement. For indirect measurement of the intake mass flow, a characteristic pressure loss and also the ambient conditions can be determined. The recirculation portion is produced for example from the position and the characteristic of the corresponding adjustable flap or actuating device.

Installations which, depending upon the selected method disclosed herein, can also have a device for online analysis of the fuel gas.

Figure 2:
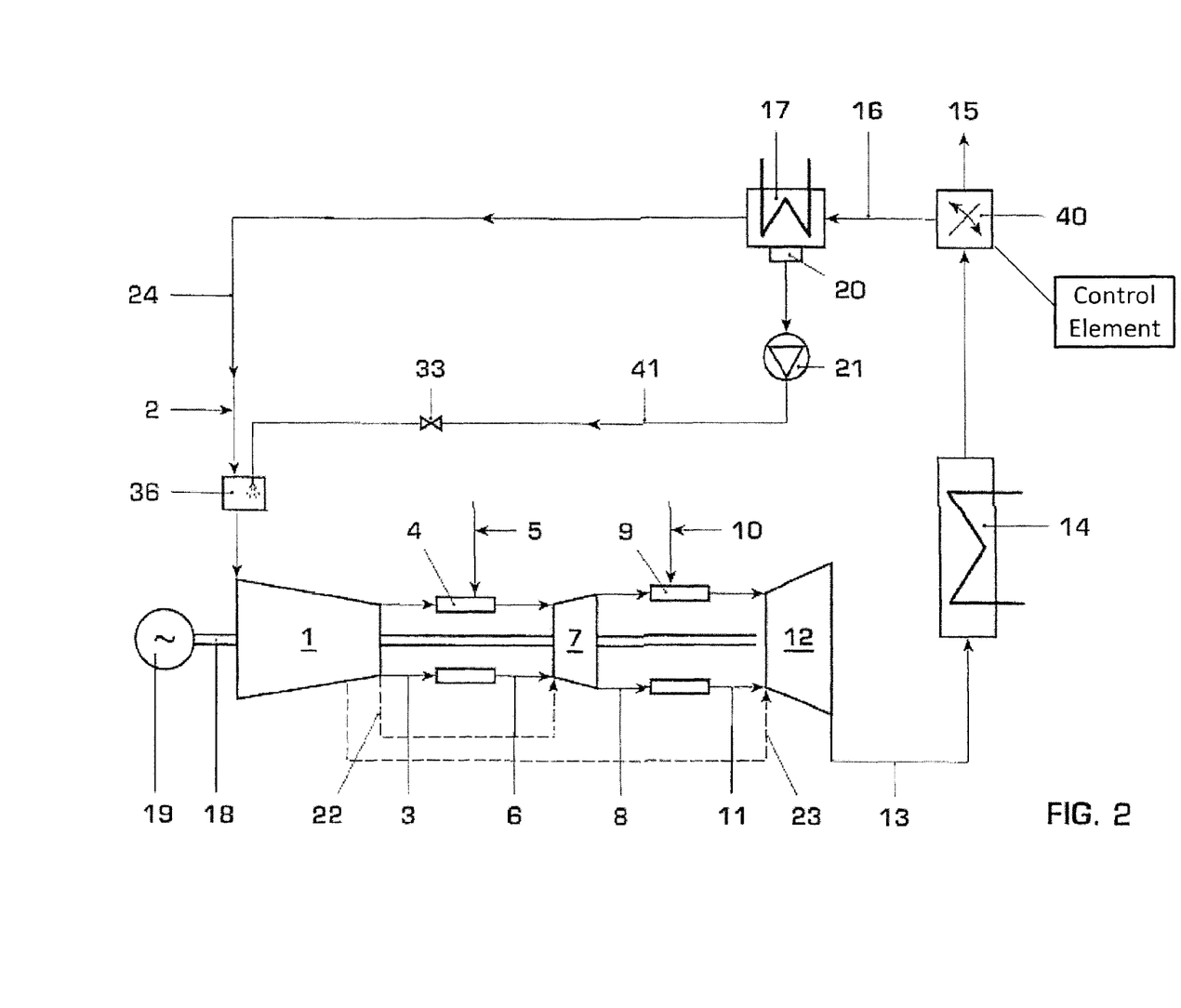
FIG. 2 shows an exemplary arrangement for carrying out a method for flue gas recirculation based on an exemplary gas turbine installation with sequential combustion.
Figure 3:
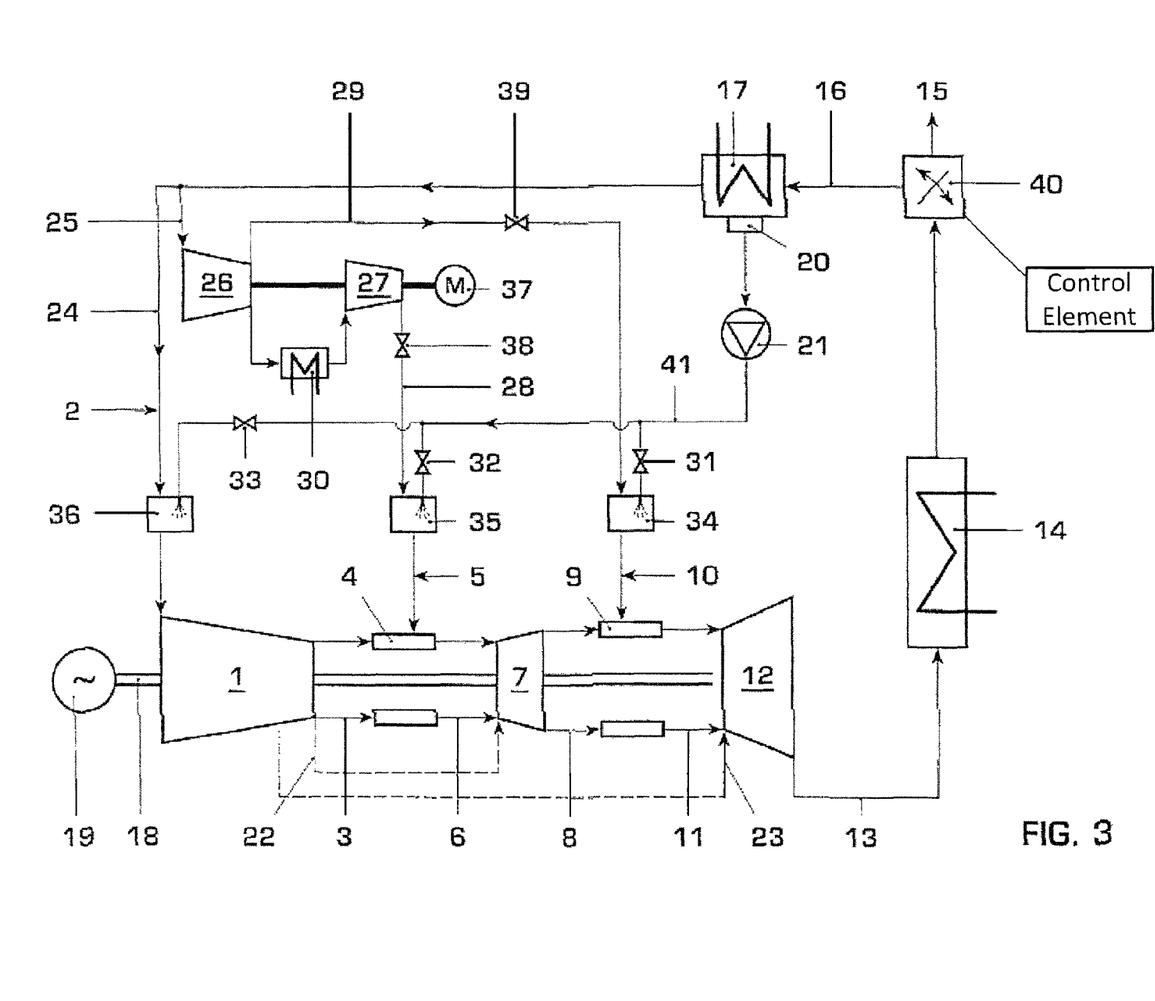
FIG. 3 shows an exemplary arrangement for carrying out a method for flue gas recirculation based on an exemplary gas turbine installation with sequential combustion with dilution of the fuel gases.

Exemplary embodiments are schematically shown in FIGS. 2 and 3.

Implementation of the Disclosure

An exemplary gas turbine installation with an arrangement for carrying out the method according to the disclosure can include at least one compressor, at least one combustion chamber and at least one turbine which via at least one shaft drives the compressor and a generator.

FIG. 2 shows an exemplary gas turbine installation with sequential combustion, which also comprises a compressor 1, a first combustion chamber 4, a first turbine 7, a second combustion chamber 9, a second turbine 12, and also a generator 19. The turbines 7 and 12 drive the compressor 1 and the generator 19 via a shaft 18.

According to the disclosure, flue gas 13, after discharging from the waste-heat boiler 14 which is connected downstream to the gas turbine installation, is fed back into the intake air 2 via a recooler 17 to, for example, consequently reduce the oxygen concentration in the combustion air and to realize a robust, flashback-free combustion.

The recooling temperature can, for example, depend upon the available cooling media and environmental conditions. If available in sufficient quantity, the use of cooling water for recooling can be advantageous. Another embodiment is recooling via air-to-air cooling by the environmental air. In this case, the temperature of the recirculated air is cooled for example to about 10 K (or greater or lesser, as desired) above the ambient outside temperature. If cooling water, for example from a flow, is available, the recirculated air can be further cooled. The recooling, depending upon operating conditions, for example can also be carried out by injection of water or can be realized by means of a combination of heat exchanger and water injection. In such an embodiment, water which acts with a kinetically retarding effect can be admixed into the combustion air.

Depending upon ambient conditions, the operating conditions of the gas turbine installation, the recooling temperature and the portion of recirculated mass flow, some of the water vapor which is contained in the recirculated flue gas can be condensed. The condensate 41 can be removed from the recirculated flue gas in a drop separator or condensate separator 20 in order to, for example, prevent drop erosion in the compressor (1, 26 and 27). The condensate can be re-injected into the intake air (36) in a profitable manner for intercooling and reduction of the compression work. For injection, the condensate can be pressurized by means of a pump 21.

For embodiments in which the recirculation portion is controlled in order to control, for example, the oxygen content in the flue gas or in the combustion air, an adjustable device 40 can be provided for flue gas splitting. This, for example, can be an adjustable flap. Another exemplary possibility for adjusting the recirculation portion is the combination of a mechanically fixed flow splitter with downstream actuating components, such as a flap or a valve, in the recirculation line and/or the flue gas line.

FIG. 3 shows an exemplary gas turbine installation with sequential combustion, in which the flue gas recirculation which is explained according to FIG. 2 is realized. Furthermore, in this embodiment some of the flue gas is used for fuel gas dilution.

The flue gas 25 which is provided for fuel gas dilution first can be compressed in an flue gas compressor 26. The flue gas 28 which for fuel gas dilution is provided in the first combustion chamber 4 can be further compressed via a high-pressure compressor 27. The compressors 26 and 27 can be driven by at least one motor 37. Upstream of the high-pressure compressor 27, an intercooler 30 can be provided for reduction of the compression work. In addition, recoolers can be provided after the compression for reduction of the flue gas temperature during fuel gas dilution. For controlling the dilution ratio, control valves 38 and 39 can be provided for the feed into the fuel gas. With these, the dilution mass flows 28 and 29 can be adjusted in dependence upon the amounts of fuel gas 5 and 10 for the first and second combustion chambers 4 and 9 and upon the desired dilution ratio.

In this embodiment, for intercooling and reduction of the compression work, the condensate can be profitably re-injected, via an injection device 36, into the intake air 2 and/or, via injection devices 34, 35, into the recirculated air 28, 29 which is provided for fuel dilution. For injection, the condensate can be pressurized by means of a pump 21. Controlling of the condensate mass flows for injection can be undertaken via the condensate control valves 31, 32 and 33.

In an exemplary embodiment, some of the flue gas flow can be branched off and recirculated 16 in an uncontrolled manner by means of a flow splitter and the residual flue gas flow 15 fed to the exhaust stack.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor
2 Intake air
3 Compressed air
4 First combustion chamber
5 Fuel gas feed line
6 Hot gases
7 First turbine
8 Partially expanded hot gases
9 Second combustion chamber
10 Fuel gas feed line
11 Hot gases
12 Second turbine
13 Flue gases (to the waste-heat boiler)
14 Waste-heat boiler
15 Flue gases/flue gas line to the exhaust stack
16 Recirculated flue gases
17 Recooler
18 Shaft
19 Generator
20 Condensate separator
21 High-pressure pump
22 Cooling air
23 Cooling air
24 Flue gas recirculation into the intake air
25 Flue gas recirculation for fuel gas dilution with flue gas
26 Flue gas compressor
27 High-pressure flue gas compressor
28 High-pressure flue gas/flue gas line for fuel gas dilution
29 Low-pressure flue gas/flue gas line for fuel gas dilution
30 Intercooler
31 Condensate control valve (for injection into low-pressure flue gas)
32 Condensate control valve (for injection into high-pressure flue gas)
33 Condensate control valve (for injection into intake air)
34 Condensate injection into low-pressure flue gas
35 Condensate injection into high-pressure flue gas
36 Condensate injection into the intake mass flow
37 Drive motor of the flue gas compressor
38 Control valve for fuel gas dilution
39 Control valve for fuel gas dilution
40 Flow splitter, brancher with flue gas flap
41 Condensate

What is claimed is:

1. A method for operating a gas turbine installation with hydrogen-rich fuel gas, comprising:
cooling at least a portion of a flue gas in a recooler;
recirculating at least the portion of flue gas mass flow into an intake air of a compressor, wherein the portion of recirculated flue gas mass flow is controlled by at least one suitable control element;
providing as a control reference value for the control element, at least one of a residual oxygen content of the flue gas and an oxygen content of combustion air;
selecting the reference value for controlling the oxygen content dependent upon operating parameters of the gas turbine installation; and
separating condensate which occurs during the recooling of the recirculated flue gases in a condensate separator.

2. The method as claimed in claim 1, comprising:
guiding the flue gas through a boiler; and
splitting the flue gas, after discharging from the boiler, into two partial flows, at least one of the two partial flows being further cooled in a recooler and recirculated into intake air of the compressor.

3. The method as claimed in claim 1, comprising:
processing separated-out condensate; and
injecting the separated-out condensate for cooling and/or intercooling in an atomized state into the intake air and/or into the recirculated flue gas which is provided for fuel dilution.

4. The method as claimed in claim 1, comprising:
selecting the reference value for controlling the residual oxygen content in the flue gas or in the combustion air as a constant; or
selecting the reference value of the oxygen content dependent upon fuel gas composition and selecting the reference value of the residual oxygen content inversely proportional to hydrogen content in the fuel gas.

5. The method as claimed in claim 1, wherein the selected reference value for controlling the residual oxygen content depends on at least one of:
a compressor inlet temperature;
a hot gas temperature; and
a position of compressor inlet guide vanes.

6. The method as claimed in claim 1, wherein the selected reference value for controlling the residual oxygen content is increased at a partial load compared to the content at full load.

7. A method for operating a gas turbine installation with hydrogen-rich fuel gas, comprising:
cooling at least a portion of a flue gas in a recooler;
recirculating at least the portion of flue gas mass flow into an intake air of a compressor, wherein the portion of recirculated flue gas mass flow is controlled by at least one suitable control element; and
providing as a control reference value for the control element, at least one of a residual oxygen content of the flue gas and an oxygen content of combustion air, and
wherein the method comprises at least one of:
compressing and mixing cooled flue gas with fuel gas for fuel gas dilution; and
compressing the cooled flue gas with intercooling, mixing the flue gas with fuel for fuel gas dilution, and directing the diluted fuel into at least one burner.

8. A method for operating a gas turbine installation with hydrogen-rich fuel gas, comprising:
cooling at least a portion of a flue gas in a recooler;
recirculating at least the portion of flue gas mass flow into an intake air of a compressor, wherein the portion of recirculated flue gas mass flow is controlled by at least one suitable control element; and
providing as a control reference value for the control element, at least one of a residual oxygen content of the flue gas and an oxygen content of combustion air;
wherein the hydrogen-rich fuel gas is pure hydrogen to produce a CO-free and UHC (unburnt hydrocarbon)-free combustion without $CO_2$ emission.

9. A method for operating a gas turbine installation with hydrogen-rich fuel gas, comprising:
cooling at least a portion of a flue gas in a recooler;
recirculating at least the portion of flue gas mass flow into an intake air of a compressor, wherein the portion of recirculated flue gas mass flow is controlled by at least one suitable control element; and
providing as a control reference value for the control element, at least one of a residual oxygen content of the flue gas and an oxygen content of combustion air, and
wherein the method comprises at least one of:
using a supplemental combusting of hydrogen-rich fuel gas for starting and/or during transient operation of the gas turbine installation; and
controlling the oxygen content for the transient operation with a supplemental feed forward control of the recirculated flue gas mass flow.

10. A gas turbine installation comprising:
at least one compressor;
at least one combustion chamber;
at least one turbine;
at least one flow splitter in an flue gas passage;
a first flue gas line from the flow splitter to an exhaust stack;
a second flue gas line from the flow splitter to an inlet of the compressor for flue gas recirculation;
at least one control element for controlling a portion of recirculated flue gas mass flow, wherein a control reference value of the control element is at least one of a residual oxygen content of the flue gas and an oxygen content of combustion air, the reference value of the control element being dependent upon operating parameters of the gas turbine installation; and
at least one device for recooling of the recirculated flue gas flow, and
wherein the flow splitter includes at least one of:
a. an adjustable flap for variable flow splitting; and
b. a mechanically fixed splitter followed by at least one of an adjustable flap, a valve in a feed line to the exhaust stack, and a valve in a recirculation line.

11. A gas turbine installation comprising:
at least one compressor;
at least one combustion chamber;
at least one turbine;
at least one flow splitter in an flue gas passage;
a first flue gas line from the flow splitter to an exhaust stack;
a second flue gas line from the flow splitter to an inlet of the compressor for flue gas recirculation;
at least one control element for controlling a portion of recirculated flue gas mass flow, wherein a control reference value of the control element is at least one of a residual oxygen content of the flue gas and an oxygen content of combustion air, the reference value of the control element being dependent upon operating parameters of the gas turbine installation; and
at least one device for recooling of the recirculated flue gas flow, and
wherein the gas turbine installation comprises at least one of:
a. condensate separator; and
b. a condensate processing plant, a line to an inlet of the compressor, and a pump for water injection into an intake mass flow.

12. The gas turbine installation as claimed in claim 11, comprising at least one of:
a. a flue gas compressor which compresses at least some recirculated flue gas to a pressure which is high enough for introduction into a fuel gas, flue gas lines to a fuel gas system, at least one device for introducing the flue gas into the fuel gas for fuel gas dilution, at least one control valve for controlling the dilution mass flow, and a fuel gas distribution system which directs diluted fuel gas to at least one burner; and
b. a condensate processing plant, lines to an flue gas compressor and at least one pump for injection of water into the flue gas compressor for intercooling.

13. A gas turbine installation comprising:
at least one compressor;
at least one combustion chamber;
at least one turbine;
at least one flow splitter in a flue gas passage;
a first flue gas line from the flow splitter to an exhaust stack;
a second flue gas line from the flow splitter to an inlet of the compressor for flue gas recirculation;
at least one control element for controlling a portion of recirculated flue gas mass flow, wherein a control reference value of the control element is at least one of a residual oxygen content of the flue gas and an oxygen content of combustion air; and
at least one device for recooling of the recirculated flue gas flow, and
wherein the gas turbine installation comprises at least one of:
a. a flue gas compressor which compresses at least some recirculated flue gas to a pressure which is high enough for introduction into the fuel gas, flue gas lines to a fuel gas system, at least one device for introducing the flue gas into the fuel gas for fuel gas dilution, at least one control valve for controlling the dilution mass flow, and a fuel gas distribution system which directs diluted fuel gas to at least one burner; and b. a condensate processing plant, lines to an flue gas compressor and at least one pump for injection of water into the flue gas compressor for intercooling.

14. A gas turbine installation comprising:

at least one compressor;

at least one combustion chamber;

at least one turbine;

at least one flow splitter in an flue gas passage;

a first flue gas line from the flow splitter to an exhaust stack;

a second flue gas line from the flow splitter to an inlet of the compressor for flue gas recirculation;

at least one control element for controlling a portion of recirculated flue gas mass flow, wherein a control reference value of the control element is at least one of a residual oxygen content of the flue gas and an oxygen content of combustion air, the reference value of the control element being dependent upon operating parameters of the gas turbine installation; and at least one device for recooling of the recirculated flue gas flow, and wherein the gas turbine installation comprises at least one of:

a. a measuring instrument for direct oxygen content measuring;

b. an online gas analyzer;

c. a device for indirect determination of oxygen content which calculates residual oxygen from compressor intake mass flow, the portions of flue gas mass flow, fuel gas composition and fuel quantity measurement; and d. a device for online analysis of a fuel gas.

* * * * *